(12) United States Patent
Morimoto et al.

(10) Patent No.: US 6,469,972 B1
(45) Date of Patent: Oct. 22, 2002

(54) DISK DEVICE FOR DISKS OF DIFFERENT SIZES

(75) Inventors: Takao Morimoto; Masao Sato; Tatsunori Fujiwara, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 38 days.

(21) Appl. No.: 09/669,627

(22) Filed: Sep. 26, 2000

Related U.S. Application Data

(63) Continuation of application No. PCT/JP99/00597, filed on Feb. 12, 1999.

(51) Int. Cl.⁷ .................................. G11B 17/04
(52) U.S. Cl. .................................... 369/77.1
(58) Field of Search .................... 369/187, 75.1, 369/75.2, 77.1, 77.2; 360/99.02, 99.06

(56) References Cited

U.S. PATENT DOCUMENTS

| | | | |
|---|---|---|---|
| 5,031,171 A | * 7/1991 | Kurumada et al. | 360/99.02 |
| 5,036,509 A | * 7/1991 | Kobayashi | 360/99.02 |
| 5,097,460 A | 3/1992 | Camps et al. | 369/77.1 |
| 5,136,570 A | * 8/1992 | Takai et al. | 360/99.06 |
| 5,493,551 A | 2/1996 | Kido | 369/77.1 |
| 5,719,844 A | * 2/1998 | Abe | 369/77.1 |
| 6,157,607 A | * 12/2000 | Nakamichi | 369/191 |

FOREIGN PATENT DOCUMENTS

| | | |
|---|---|---|
| JP | U211540 | 1/1990 |
| JP | A3280257 | 12/1991 |
| JP | A3296962 | 12/1991 |
| JP | A490163 | 3/1992 |
| JP | A9237455 | 9/1997 |

* cited by examiner

*Primary Examiner*—Brian E. Miller
*Assistant Examiner*—Tianjie Chen

(57) ABSTRACT

A disk device comprises first and second disk selection projections 102, 103 which regulate an angle of the disk conveyed to a small or large disk positioning recess 121, 122 on the basis of an outer radius of the disk. The first and second disk selection projections have tapered faces 102a, 103a provided at fixed intervals on a disk guiding face 101a facing the conveying roller 111. The disk device further comprises steps 121a, 122a for positioning the small disk 201 or the large disk 200 having an angle regulated in accordance with the outer radius to the small disk positioning recess 121 or to the large disk positioning recess 122.

8 Claims, 17 Drawing Sheets

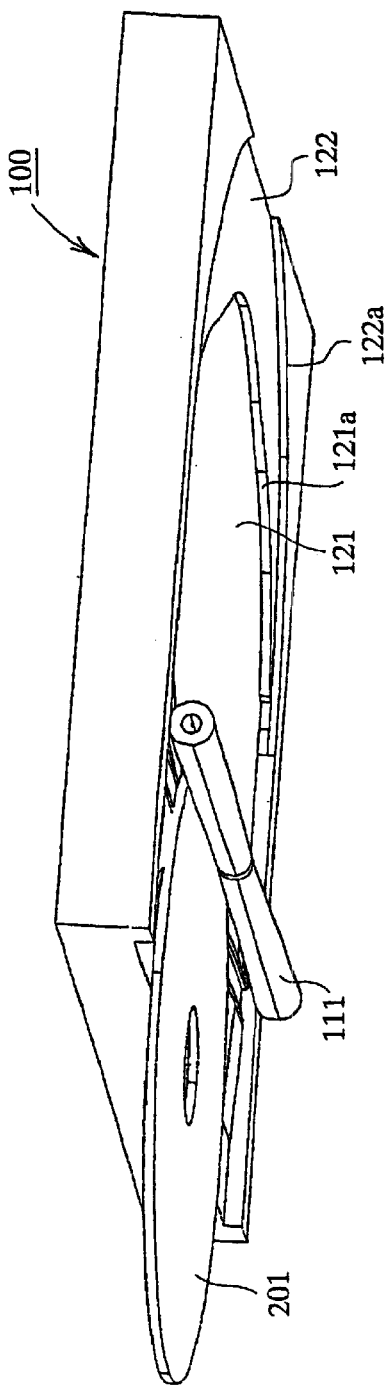
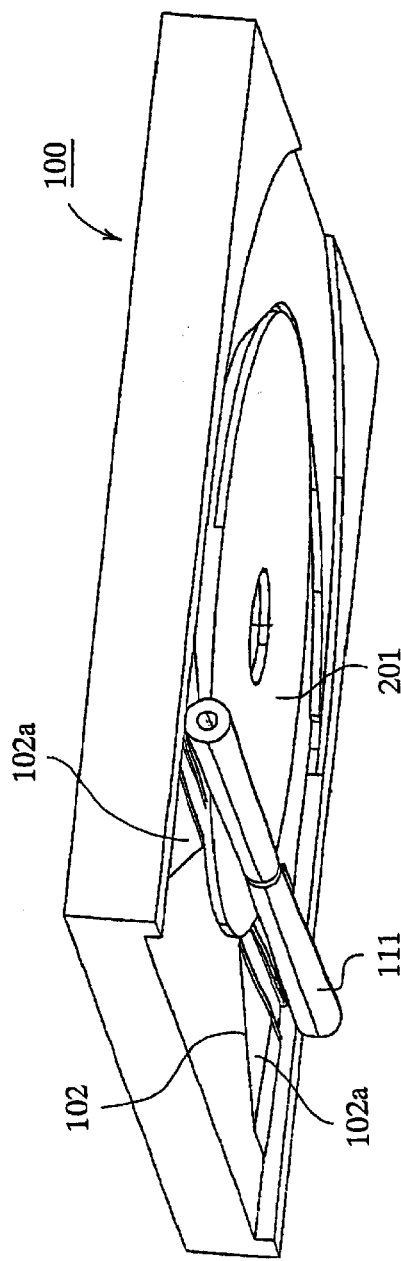

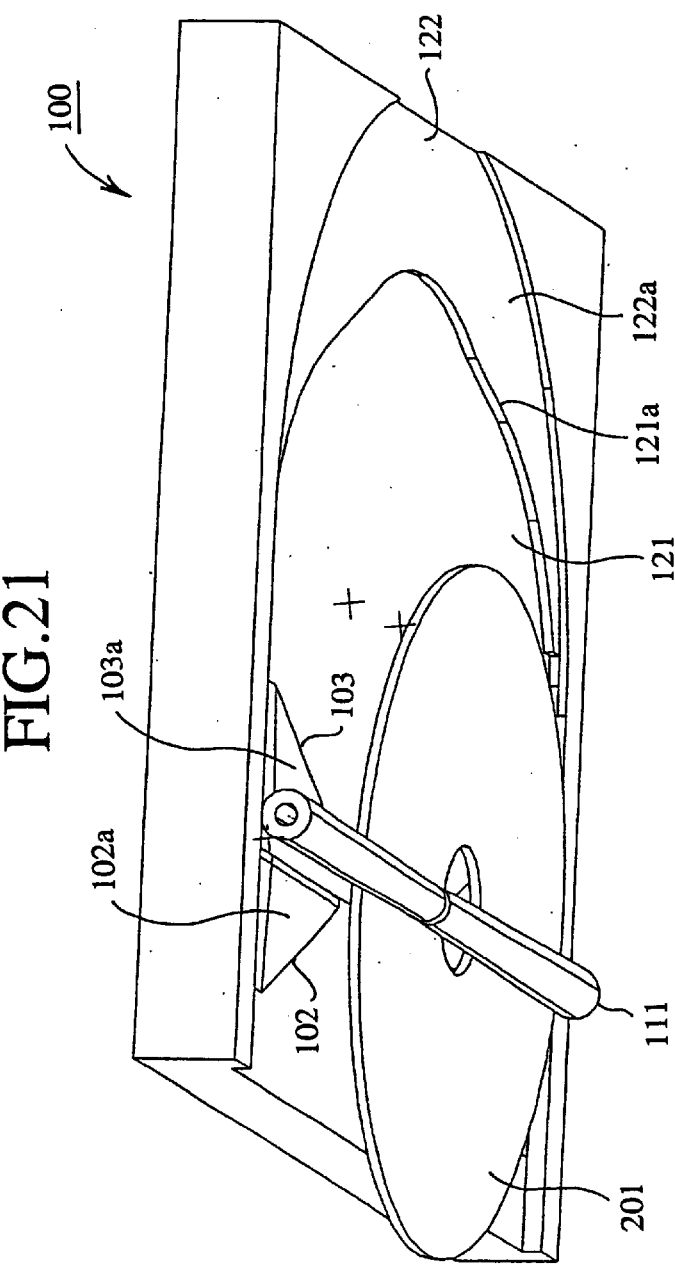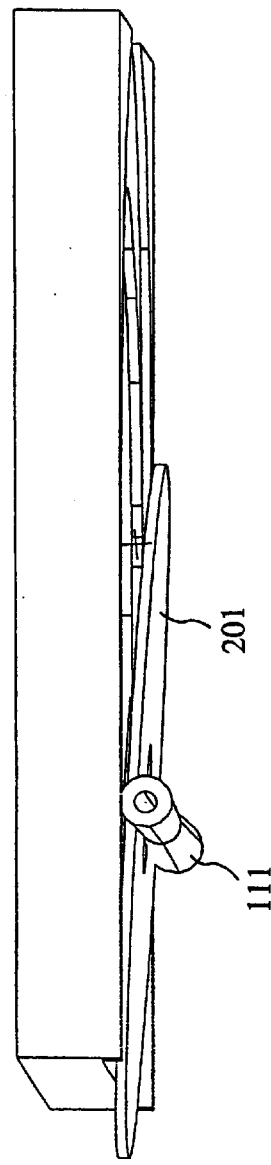
FIG.21
FIG.22

DISK DEVICE FOR DISKS OF DIFFERENT SIZES

CROSS-REFERENCE TO THE RELATED APPLICATION

This Application is a continuation of International Application No. PCT/JP99/00597, whose International filing date is Feb. 12, 1999, the disclosures of which Application are incorporated by reference herein.

BACKGROUND OF THE INVENTION

1. Field of the Invention

The present invention relates to a disk device having a positional determination mechanism which can use disks of various outer diameters.

2. Description of the Related Art

A conventional disk device, in particular a disk device which can use disks of various outer diameters, needs a disk loading device for conveying the disks of various outer diameters to a turntable and for performing the positional determination. Such a disk loading device is generally complicated in that it has a positional determination mechanism which can use the disks of various sizes. This furthermore increases the overall size of the device.

FIGS. 1 through 12 show such a disk loading device. In the figures, 301 and 302 are guide levers, 303 is a disk guide plate, 303a is a refuge guide section, 304 is a slider, 305 is a link lever, 306 and 307 are guide levers, 306a and 307a are guide pins, 308 is an arm, 310 is a clamp, 311 is a clamp arm, 311a is a small disk stopper, 312a is a large disk stopper, 312 is a base, 313 is a turntable, 314 is a spindle motor, 315 is a transfer roller, 316 is a top plate, 317 is a player cabinet, 317a is a front face into which a disk is inserted, 318 is a spring.

A front face aperture 317a into which disks are inserted is provided in the front face of the player cabinet 317. As shown by FIG. 3, a guide lever 301, 302 which detects the size of the disk, a slider 304 which displaces in tandem with the guide lever 301, 302 as shown in FIG. 1, an arm 308 which engages due to the displacement of the slider 304, a guide lever 306, 307 which guides a disk into the device, a link lever 305 which is opened and closed by connection to the guide lever 306, 307, and a disk guide plate 303 which guides the upper face of the disk are mounted on the upper plate 316 provided in the player cabinet 317.

A refuge guide 303a which projects so that a large disk can avoid the small disk stopper 311a is provided on the disk guide plate 303. On the lower section of the disk guide plate 303, a transfer roller 315 is provided to displace the disk and the turntable 313 is provided behind the transfer roller 315. In addition, a spindle motor 314 which drives the turntable 313 and a base 312 to fix the above components are also provided on the lower section.

Above the turntable 313, a clamp 310 is provided which positions and holds an inserted disk on the turntable by the central hole of the disk. The clamp 310 is supported on the clamp arm 311 which rotates about the shaft 312b on the base 312. A stopper 311a is provided which determines the position of a small disk on the clamp arm 311. Another stopper 312a is provided on the base 312 to determine the position of a large disk.

The operation of the conventional disk device will be explained below.

A disk inserted into a conventional disk loading device is transferred in the horizontal direction in contact with the face of the disk guide plate 303 by the disk guide plate 303 and the transferring roller 315.

FIGS. 5 through 8 represent a small disk A as inserted into a device. The outer periphery of the inserted small disk A abuts with the guide pins 301a, 302a of the guide lever 301, 302 as shown in FIG. 5. The guide lever 301, 302 is extended as the small disk A is transferred inwardly. A slider 304 which engages with the linking pins 301b, 302b of the guide lever 301, 302 displaces in a direction of the arrow D. As shown in FIG. 6 when a small disk is inserted the bent projection 304a of the slider 304 and the sloping section 308c of the arm 308 do not engage.

When a small disk is transferred, the outer periphery of the small disk A abuts with the guiding pins 306a, 307a of the guiding lever 306, 307 as shown in FIG. 7. As the guiding lever 306, 307 is enlarged, the disk abuts with the small disk stopper 311a and its position is determined.

The arm 308 is displaced in direction E as shown in FIG. 8 by the sliding lever 308. The guiding pins 306a, 307a which are in abutment with the outer periphery of the small disk A due to the arm 308 separate from the outer periphery of the small disk A and lock the guiding lever 306, 307. The guiding lever 301, 302 is returned to the pre-extension position by the spring 318 when the small disk A is displaced inwardly.

FIGS. 9 through 12 show the device with a large diameter disk inserted. The outer periphery of the inserted large disk B abuts with the guide pins 301a, 302a of the guide lever 301, 302 as shown in FIG. 9. The guide lever 301, 302 is extended as the large disk B is transferred inwardly as shown in FIG. 10. A slider 304 which engages with the linking pins 301b, 302b of the guide lever 301, 302 displaces in the direction of the arrow D. The bent projection 304a of the slider 304 and the sloping section 308c of the arm 308 engage. The rotational range of the guiding lever 306, 307 is adapted to the radius of the large disk B by displacing the arm 308 in the direction D.

When a large disk is transferred inwardly, the outer periphery of the large disk B abuts with the guiding pins 306a, 307a of the guiding lever 306, 307 as shown in FIG. 11. As the guiding lever 306, 307 is enlarged, the face of the large disk B abuts with the refuge guide 303a which projects from the disk guide plate 303, and the direction of displacement of the large disk B is varied from a horizontal direction to an downwardly inclined direction by the projecting refuge guide 303a. Even if the large disk B is transferred further inwardly by the conveying roller 315, it is not stopped by the small disk stopper 311a and its position is determined by abutment with the large disk stopper 312a.

The arm 308 is displaced in the direction of the arrow E as shown in FIG. 12 by the slide lever in the same way as when handling a small disk A. The guiding pins 306a, 307a of the guiding lever 306, 307 are separated from the outer periphery of the large disk B and the guiding lever 306, 307 is locked. The guiding lever 301, 302 is returned to a position before enlargement by the spring 318 in the same way as when handling a small disk A.

Since a conventional disk device is constructed as above, the problem of increases in structural complexity has arisen in order to deal with CDs of different diameters such as 8 cm or 12 cm CDs. This is a result of providing the small disk stopper refuge mechanism for determining the refuge position of a small disk stopper of an 8 cm disk with respect to a 12 cm disk.

SUMMARY OF THE INVENTION

The present invention is proposed to solve the above problems and has the object of providing a simplified structure for positioning disks having different sizes.

The disk device of the present invention comprises a conveying roller for conveying circular disks of differing sizes, a disk guiding section facing the conveying roller and guiding the disk, a disk selection mechanism having projections which are provided in proximity with the conveying roller, the projections being disposed at predetermined positions of the disk guiding section for selectively abutting with a surface of the disk inserted between the conveying roller and the disk guiding section depending on an outer radius of the disk, thereby changing an angle of the disk in the conveying direction depending on the outer radius, and a positional determination mechanism for positioning the disk, the angle of which is regulated by the disk selection mechanism, to respective predetermined positions preset in accordance with the outer radius of the disk.

As a result, a simple mechanism is obtained which can position the inserted disk to a predetermined position in the device depending on the outer diameter of the disk and which can initiate a disk clamp action with respect to the disk by positioning the disk to the predetermined position.

The disk device of the present invention is provided with a disk selection mechanism which regulates an angle of a large disk in the conveying direction upon conveying the large disk so that the large disk abuts only with a large disk position determination section in the positional determination mechanism. When a small disk is conveyed, the disk selection mechanism regulates an angle of the small disk in the conveying direction so that the small disk abuts only with a small disk position determination section in the positional determination mechanism.

In this way, a difference in the angle of the disk with respect to the conveying direction is generated between disks of different outer diameters. A disk conveyed into the disk device abuts with a position determination section for small disk or for large disk depending on its outer diameter, is positioned in a predetermined position in accordance with on the outer radius of the disk and is conveyed to the fixed position which depends on the outer radius of the inserted disk.

The disk device according to the present invention is provided with a disk selection mechanism which is adapted to place the small disk in a position where the small disk does not abut with projections when the small diameter disk is positioned by the positional determination mechanism.

In this way, a simple mechanism is realized for positional determination to a fixed position, which depends on the outer diameter of the disk, of a disk inserted in a state in which the outer edge of the disk abuts with the edge of the disk insertion mouth. In addition, the initiation of disk clamp action with respect to disks the position of which has been fixed is also enabled.

BRIEF DESCRIPTION OF THE DRAWINGS

FIG. 19 is a three dimensional view showing a situation that a small diameter disk is inserted into the disk insertion mouth of the disk selection mechanism in a disk device according to a first embodiment of the present invention.

FIG. 20 is a three dimensional view showing a situation that a small diameter disk is positioned into a small disk positioning recess of a disk selection mechanism in a disk device according to a first embodiment of the present invention.

FIG. 21 is a three dimensional view showing a situation that a small disk is inserted in an off-center position towards one end of the disk insertion mouth in the disk device according to a first embodiment of the present invention.

FIG. 22 is a three dimensional view accurately showing the angle of the small disk, as shown in FIG. 21, in the conveying direction in a disk device according to the first embodiment of the present invention.

DETAILED DESCRIPTION OF THE PREFERRED EMBODIMENTS

In order to explain the invention in greater detail, the preferred embodiments of the invention are outlined below with reference to the accompanying figures.

Embodiment 1

Figure 1:
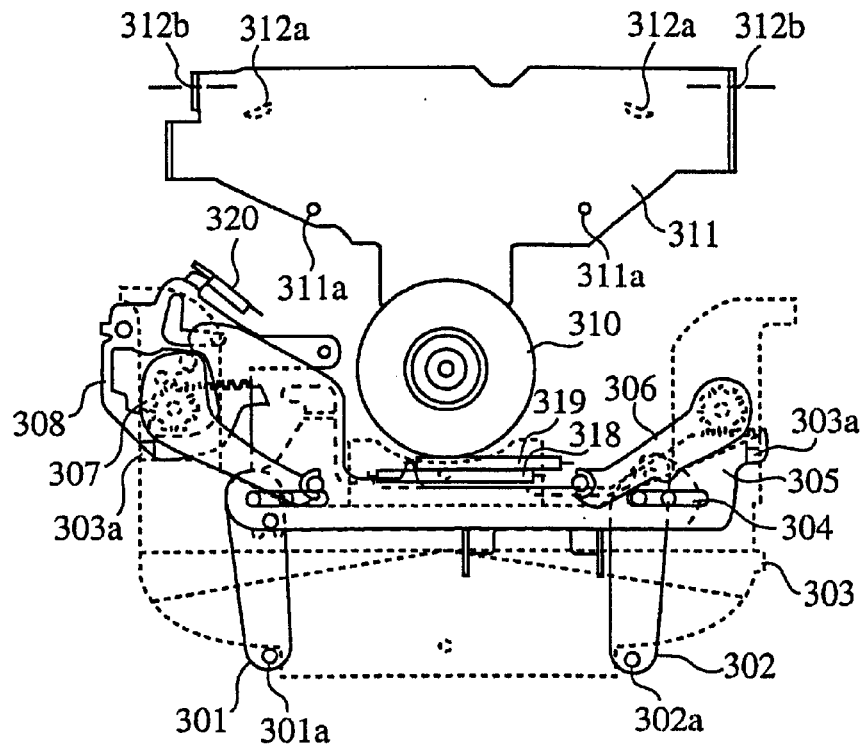
FIG. 1 shows a conventional disk loading device.
Figure 2:
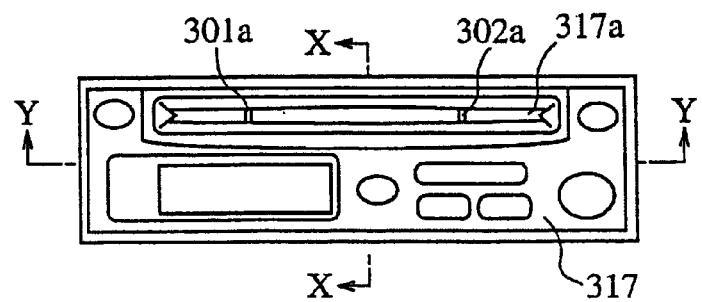
FIG. 2 shows a conventional disk loading device.
Figure 3:
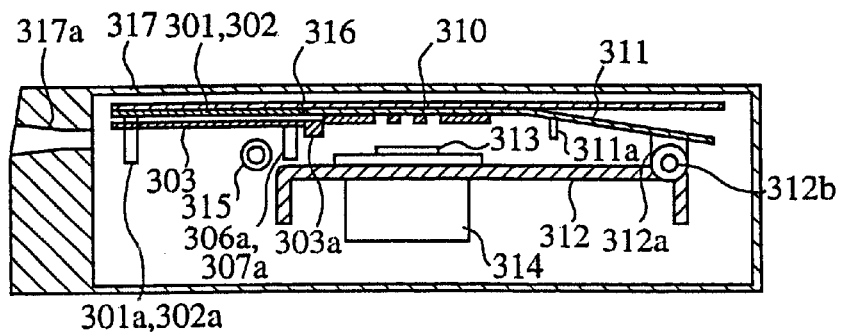
FIG. 3 shows a conventional disk loading device.
Figure 4:
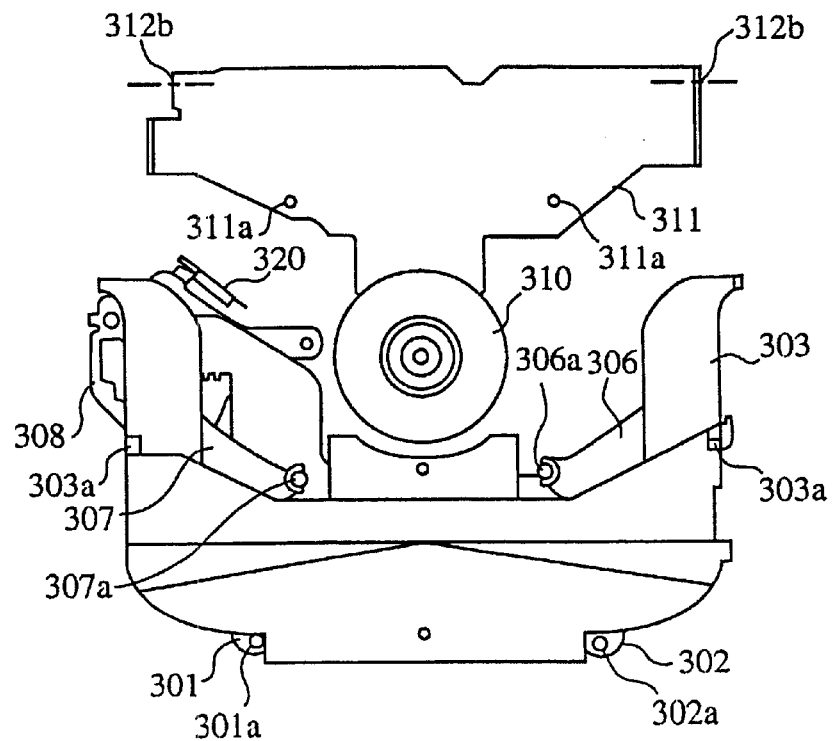
FIG. 4 shows a conventional disk loading device.
Figure 5:
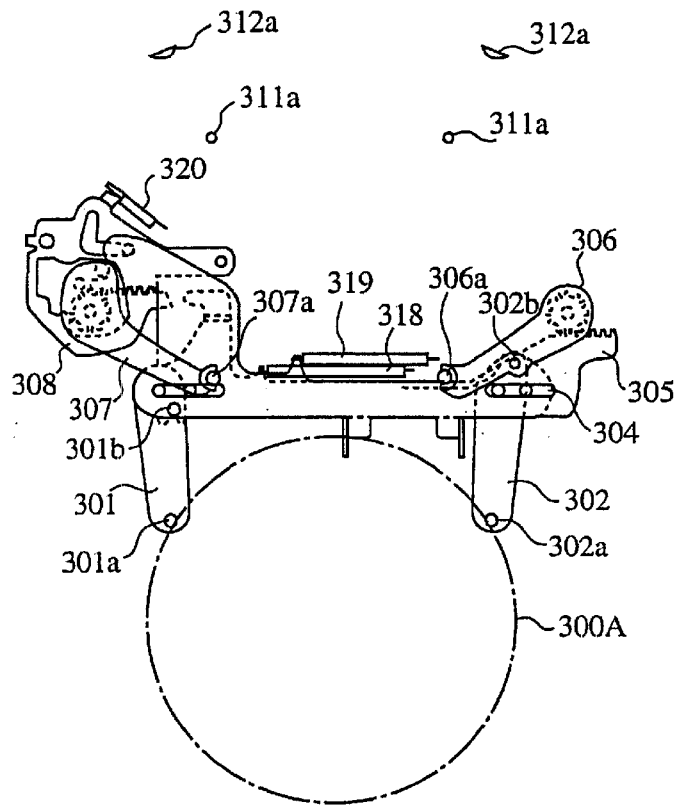
FIG. 5 shows a conventional disk loading device.
Figure 6:
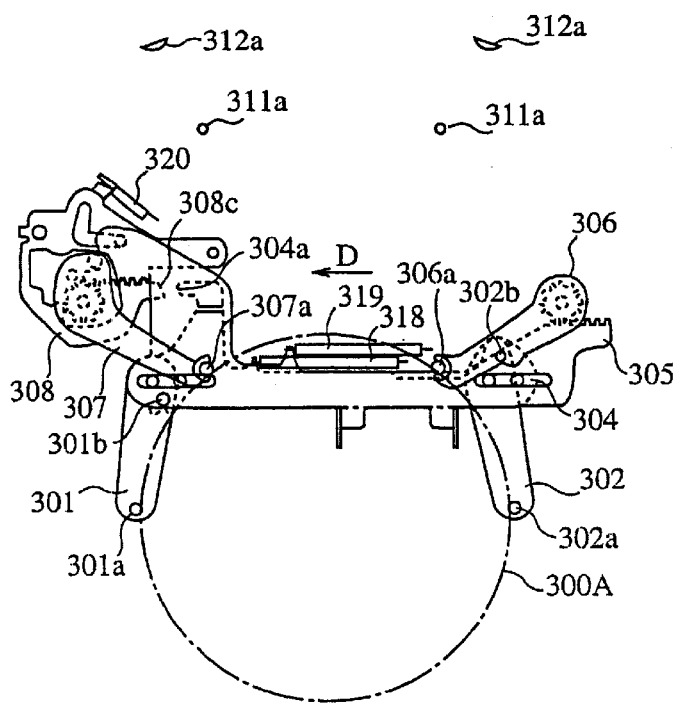
FIG. 6 shows a conventional disk loading device.
Figure 7:
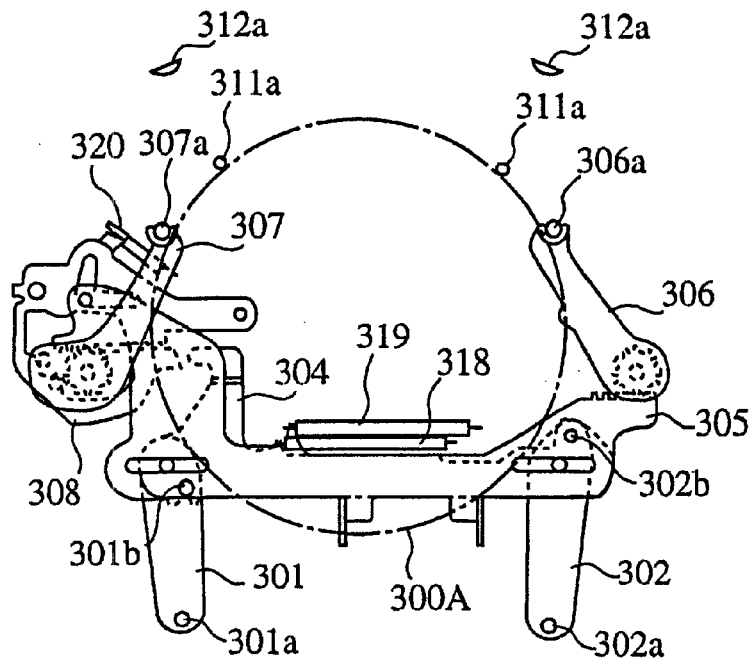
FIG. 7 shows a conventional disk loading device.
Figure 8:
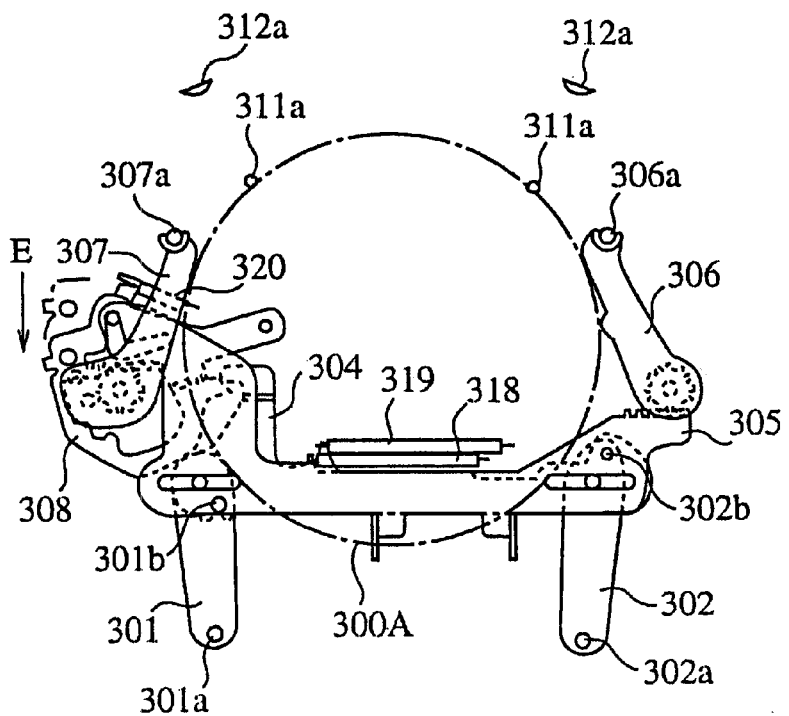
FIG. 8 shows a conventional disk loading device.
Figure 9:
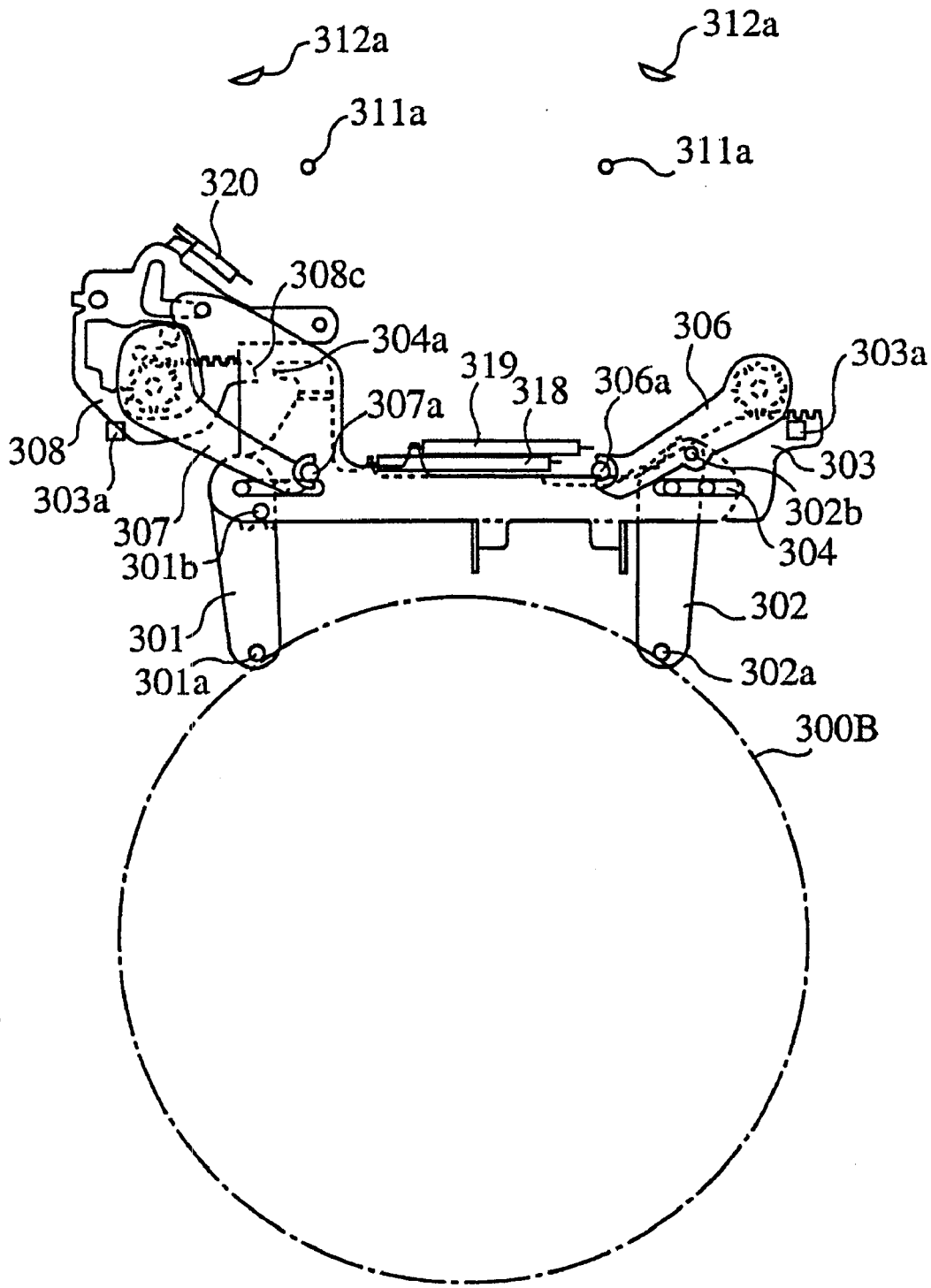
FIG. 9 shows a conventional disk loading device.
Figure 10:
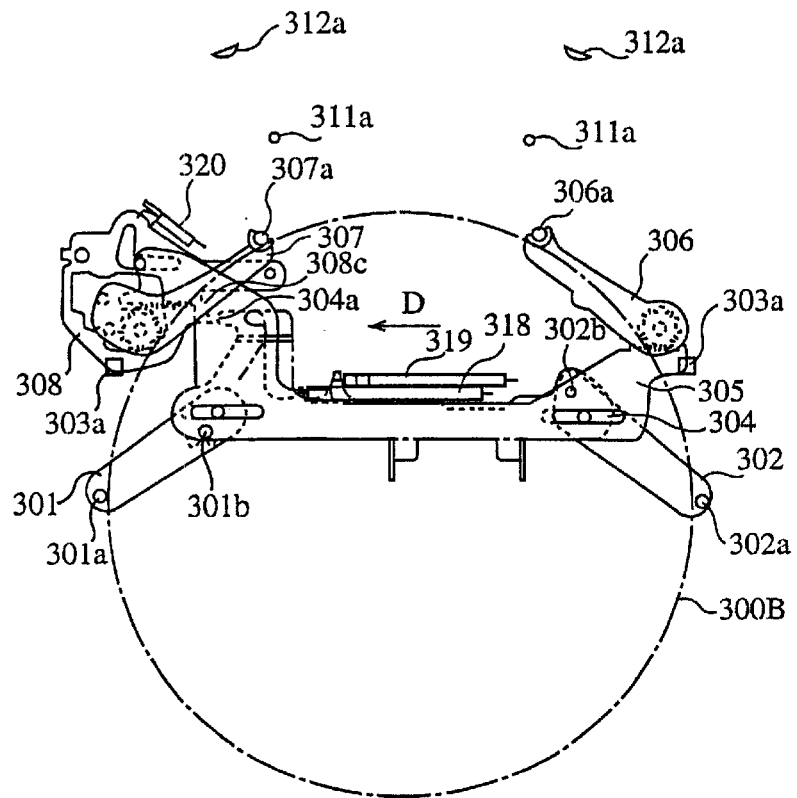
FIG. 10 shows a conventional disk loading device.
Figure 11:
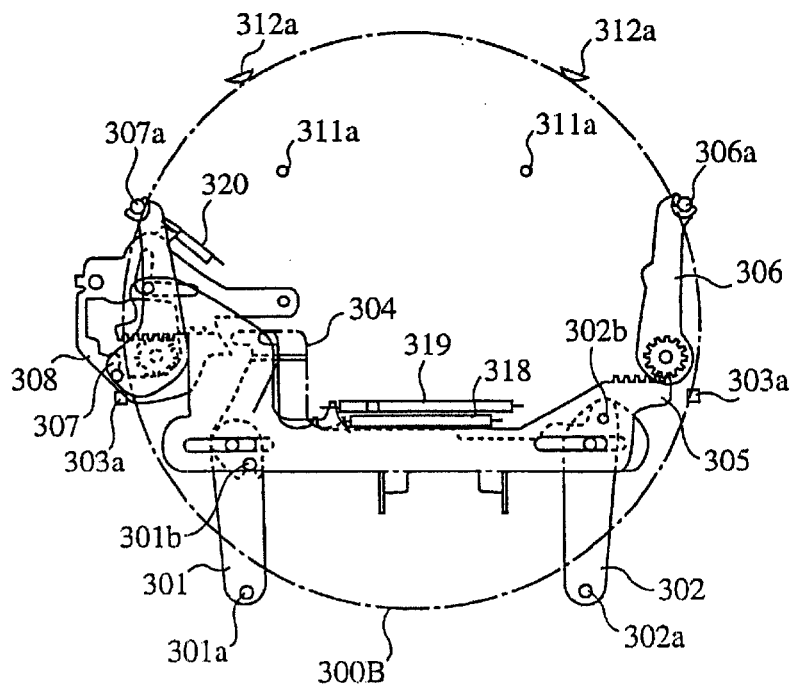
FIG. 11 shows a conventional disk loading device.
Figure 12:
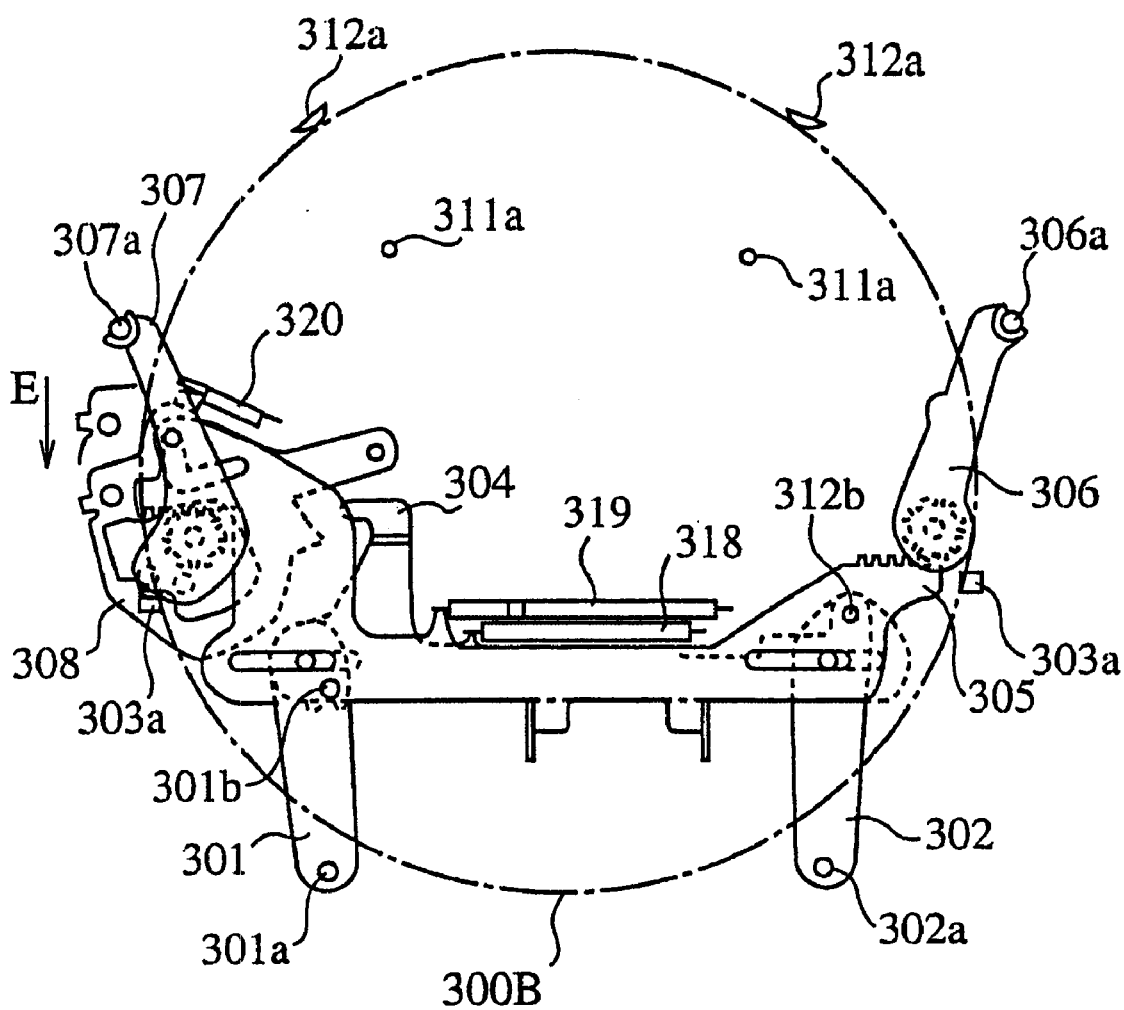
FIG. 12 shows a conventional disk loading device.
Figure 13:
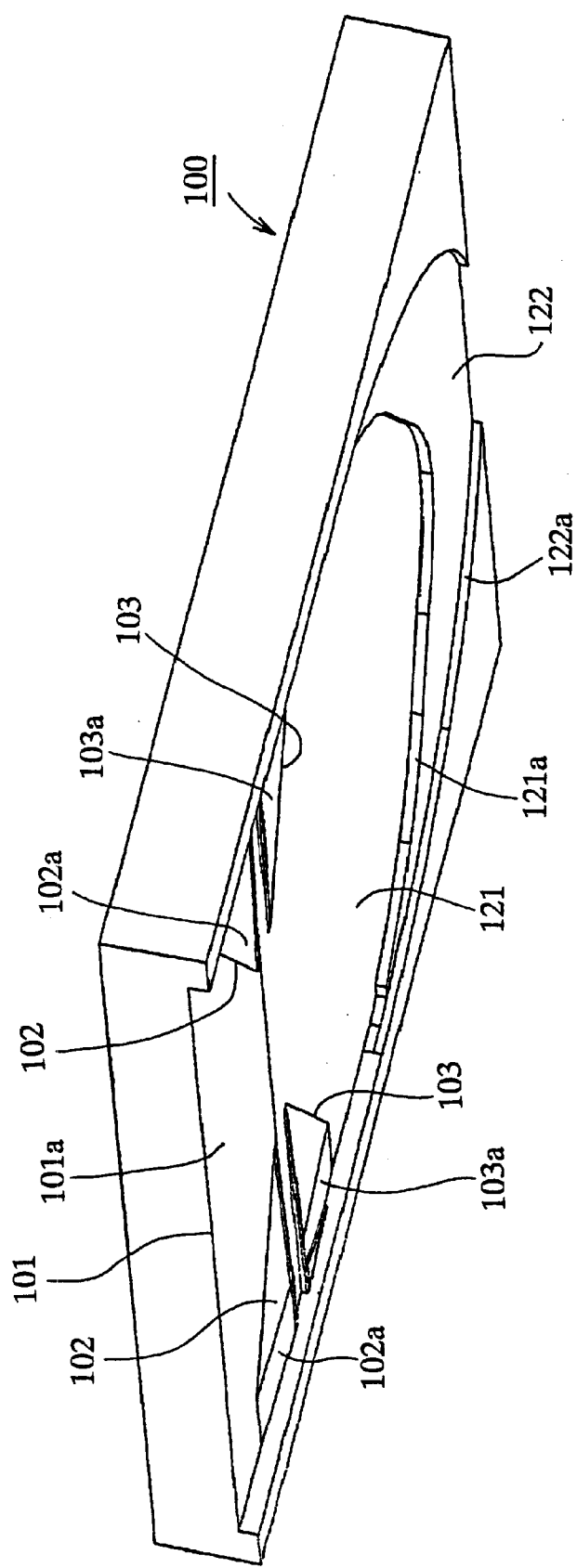
FIG. 13 is a three dimensional view showing a disk selection mechanism in a disk device according to a first embodiment of the present invention.
Figure 14:
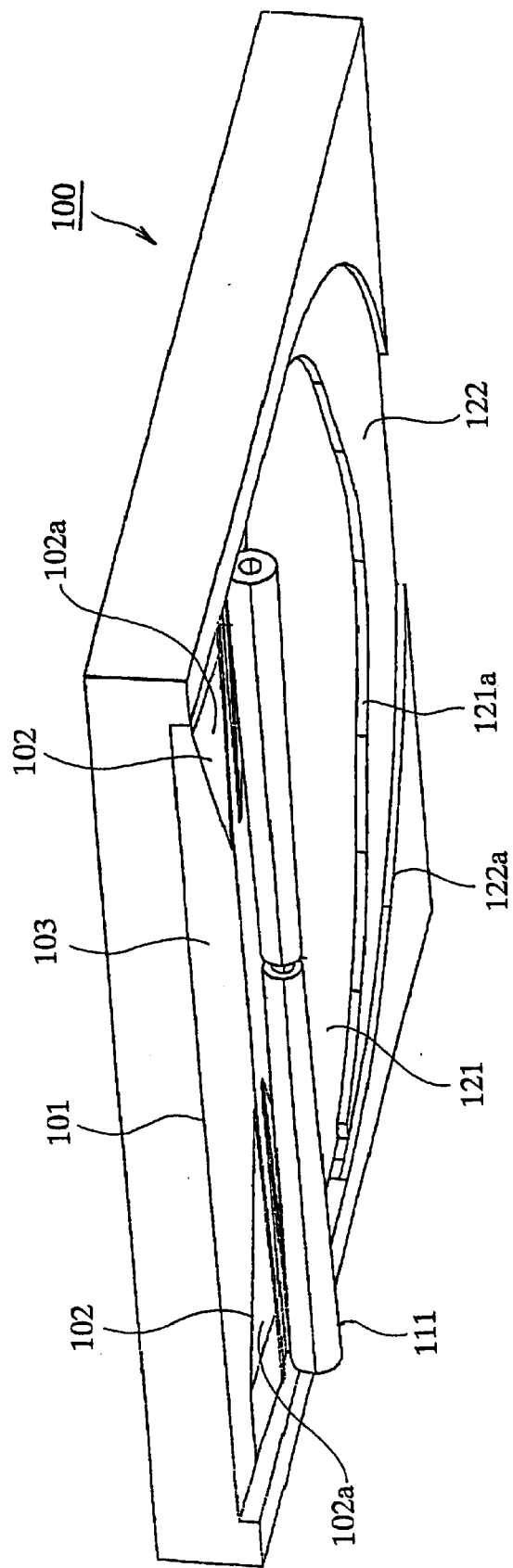
FIG. 14 is a three dimensional representation of the positional relationship between a disk selection mechanism and a conveying roller of a disk device according to a first embodiment of the present invention.

FIG. 13 is a three dimensional representation of a disk selection mechanism 100 in a disk device according to a first. embodiment of the present invention, which selects and positions for example a small diameter (8 cm) disk or a large diameter (12 cm) disk. In the figures, 101 is a disk insertion mouth, 102 is a first disk selection projection formed on both corners of the disk insertion surface in the inner face 101a of the disk insertion mouth 101 for selecting a small disk and a large disk. 103 is a second disk selection projection which is connected to the first disk selection projection 102 in the direction of disk insertion. The first and second disk selection projections 102, 103 are connected having a fixed gap in the direction of disk insertion. The conveying roller 111 is placed above the gap as shown in FIG. 14. An interval is, formed in a direction which intersects with the direction of disk insertion between the first disk selection projections 102 which are formed on both corners of the disk insertion surface in the inner face 101a of the disk insertion mouth 101. This interval is slightly larger than the diameter of a small disk. A tapered face 102a is formed on the first disk selection projection 102 so as to be raised at a fixed angle from the direction of disk insertion. A tapered face 103a is formed on the second disk selection projection 103 so as to be raised at a fixed angle from the direction of disk insertion.

FIG. 14 shows the positional relationship between the disk selection mechanism 100 and the conveying roller 111. A disk is inserted between the conveying roller 111 and the inner face 101a of the disk insertion mouth 101 and between the conveying roller 111 and the first disk selection projection 102.

When the inserted disk is of a small diameter, the small disk does not mount the tapered face 102a, 103a of the first and second selection projections 102, 103. The small disk is conveyed into the device in a horizontal state by the conveying roller 111 between the conveying roller 111 and the inner face 101a of the disk insertion mouth 101. FIG. 19 is a three dimensional representation of a small disk 201 inserted from the disk insertion mouth 101.

Figure 15:
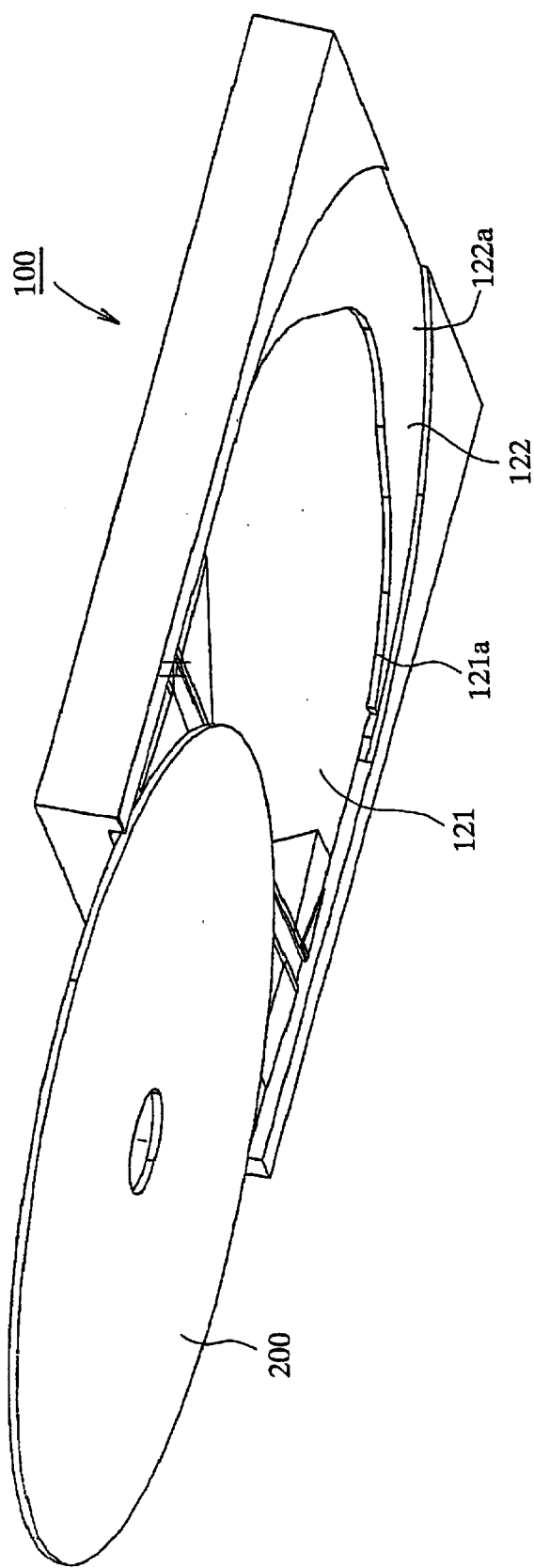
FIG. 15 is a three dimensional view showing a situation that a large diameter disk is inserted into the disk insertion mouth of a disk selection mechanism in a disk device according to a first embodiment of the present invention.
Figure 16:
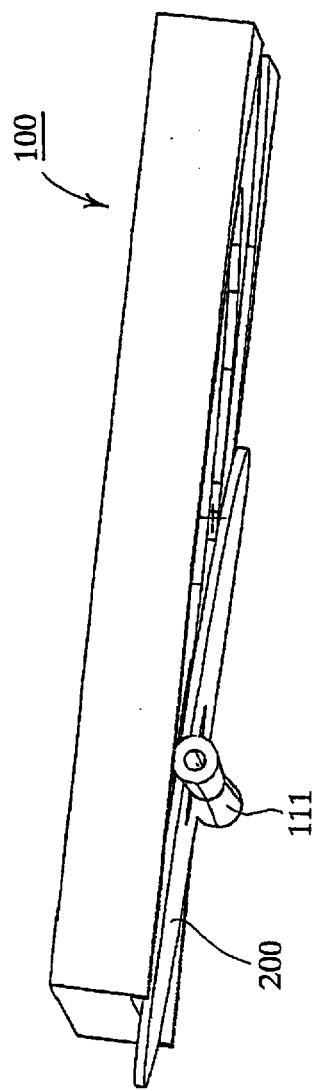
FIG. 16 is a three dimensional view showing a situation that a large diameter disk being conveyed by the conveying roller into the disk device according to a first embodiment of the present invention.

FIG. 15 is a three dimensional representation of the insertion of a large diameter disk into the disk insertion mouth. FIG. 16 is a three dimensional representation of a large diameter disk being conveyed by the conveying roller 111 into the disk device. In the figures, the reference numeral 200 denotes a large disk. As shown in these figures, when the inserted disk is of a large diameter, the large disk 200 mounts the tapered face 102a, 103a of the first and second selection projections 102, 103. The disk is conveyed into the device by the conveying roller 111 between the conveying roller 111 and the tapered face 102a, 103a. At this time, the large disk 200 is conveyed into the device by the tapered face 102a, 103a not in a horizontal state but with the leading edge in the direction of insertion inclining downwardly.

In FIG. 13, 121 is a small disk positioning recess for positioning the small disk conveyed into the device by the conveying roller 111 in a predetermined position. Small disk, which is conveyed in a horizontal state into the device by the conveying roller 111, is guided and placed in a fixed position by the abutment of the edge of the disk with the step 121a which is formed on the small disk positioning recess 121. FIG. 20 shows a three dimensional representation of a small disk as fixed into the recess 121 for positioning the small disk 201. The peripheral edge of the small disk 201 which has been fixed into the recess 121 for positioning the small disk abuts with a small disk pin 1 to be discussed below. In this way, the disk is clamped and placed on the turntable by the clamp lever.

Figure 17:
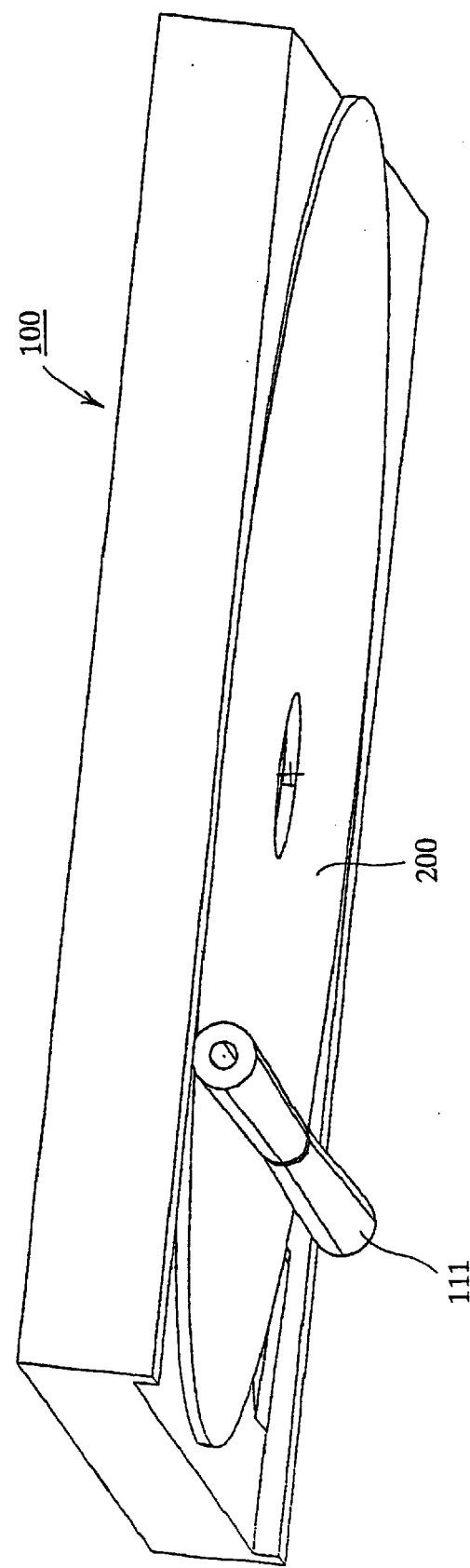
FIG. 17 is a three dimensional view showing a situation that a large diameter disk is positioned by a disk selection mechanism of a disk device according to a first embodiment of the present invention.
Figure 18:
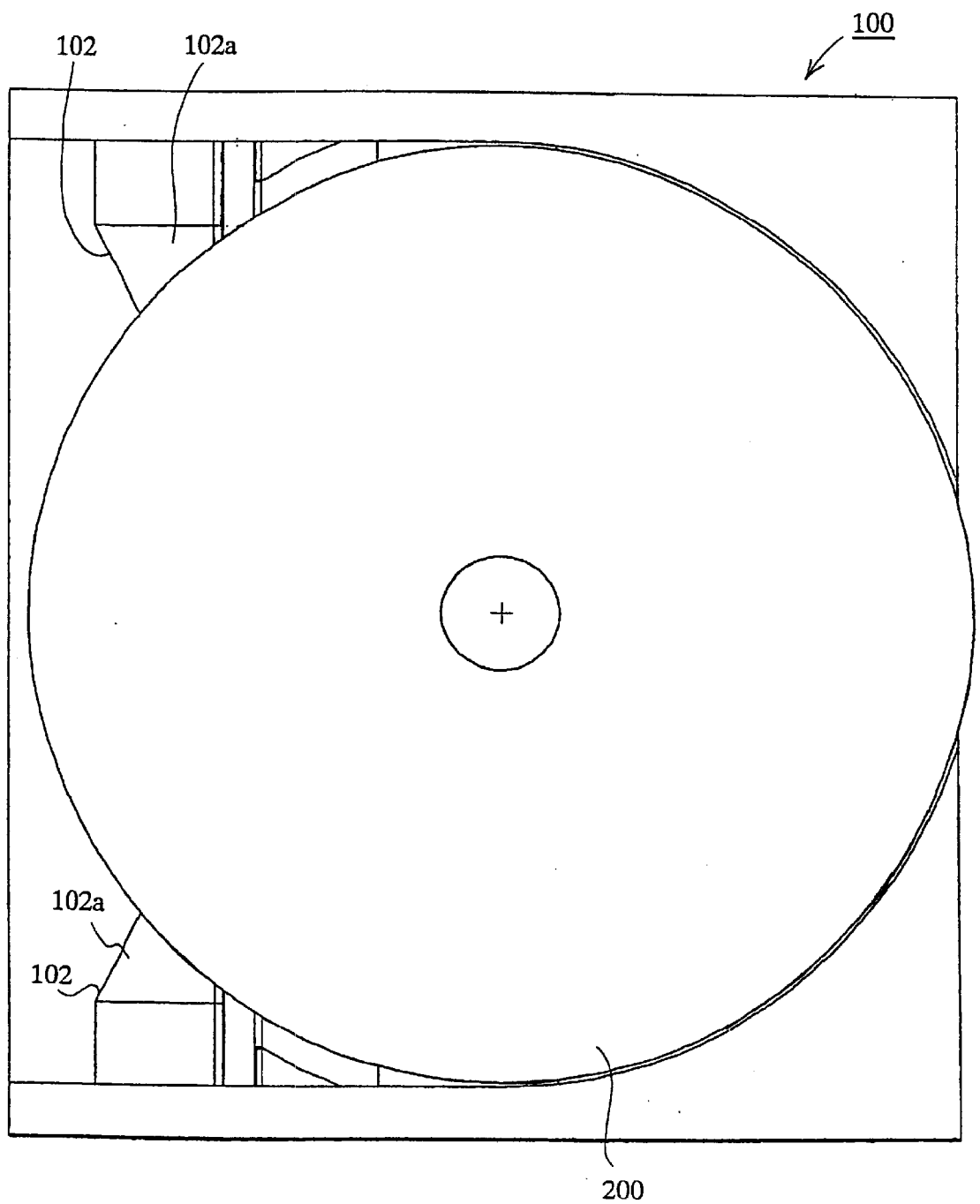
FIG. 18 is a plan view of the positioned situation of the large diameter disk, seen from the conveying roller side, in a disk selection mechanism of a disk device according to a first embodiment of the present invention.

In FIG. 13, 122 is a large disk positioning recess for positioning a large disk conveyed into the device by the conveying roller 111. Large disk, which is conveyed by the conveying roller 111 into the device with the leading edge of the disk slanting downwards, is guided and placed in a fixed position as shown in FIG. 17 by the abutment of the edge of the disk with the step 122a formed on the large disk positioning recess 122. FIG. 18 is a plan view of the fixed position of a large diameter disk 200 in the large disk positioning recess 122 as seen from the conveying roller 111 (not shown). The peripheral edge of the large disk 200 fixed into the large disk positioning recess 122 abuts with the large disk abutting pin 2 to be explained below and clamps and places the disk on the turntable with the clamp lever.

As a result, a notch (not shown) is formed on the disk selection mechanism 100 in order to enable the clamp lever to clamp from above the center of a small disk 201 fixed into the small disk positioning recess 121 or a large disk 200 fixed into the large disk positioning recess 122.

Next, the operation of the invention will be explained when a large disk or a small disk is inserted from approximately the center of the disk insertion mouth 101.

(Operation of Disk Insertion from Approximate Center of Disk Insertion Mouth 101)

When a large disk is inserted from approximately the center of the disk insertion mouth 101, the large disk 200, as shown in FIG. 15, mounts the tapered face 102a, 103a of the first and second disk selection projections 102, 103 in FIG. 14. The leading edge is slanted downwardly as shown in FIG. 16 in the direction of insertion between the tapered faces 102a, 103a and the conveying roller 111.

Since the disk selection mechanism 100 is disposed above the conveying roller 111 as shown in FIG. 15, it is adapted so that the peripheral edge of the large disk 200 does not abut with the small disk abutting pin (not shown) and is conveyed further into the device by the conveying roller 111. The large disk abuts with the large disk abutting pin (not shown) before being placed in the large disk positioning recess 122 as shown in FIGS. 17 and 18. In this way, a lever (not shown) is rotated.

On the other hand, when the inserted CD is a small radius disk, the small radius disk 201, as shown in FIG. 19, does not ride on the tapered faces 102a, 103a of the second disk selection projections 103 and the first disk selection projections 102 in FIG. 14. The disk is conveyed between the conveying roller 111 and the inner face 101a of the disk insertion mouth 101 by the horizontal conveying roller 111 into the inner housing. Before the disk is placed in a fixed position in the small disk positioning recess 121 shown in FIG. 20, the disk abuts with the small disk abutting pin. As a result, the lever is rotated.

In this way, the center of a small disk which is inserted and conveyed into the inner housing or a large disk comes to the center of the turntable. As a result, as shown in FIG. 18, when the inserted disk is a large disk, the lever above is rotated by the inserted large disk in the manner described above and the clamping operation of the large disk is initiated.

The initiation of the clamping operation above is the same for a small disk 201.

Next, the operation of inserting a small disk which is inserted off-center towards one end of a disk insertion mouth 101 will be explained.

(Disk Insertion Operation of a Small Disk which is Inserted Off-center Towards One End of a Disk Insertion Mouth 101)

As shown in FIG. 21, when a small disk 201 is inserted off-center towards one end of a disk insertion mouth 101, the inserted small disk 201, rides on one of the pairs of tapered faces 102a, 103a of the first and second disk selection projections 102, 103 shown in FIG. 14. The leading edge slopes downwardly in the direction of insertion as shown in FIG. 22 between one of the pairs of tapered faces 102a, 103a and the conveying roller 111.

Figure 23:
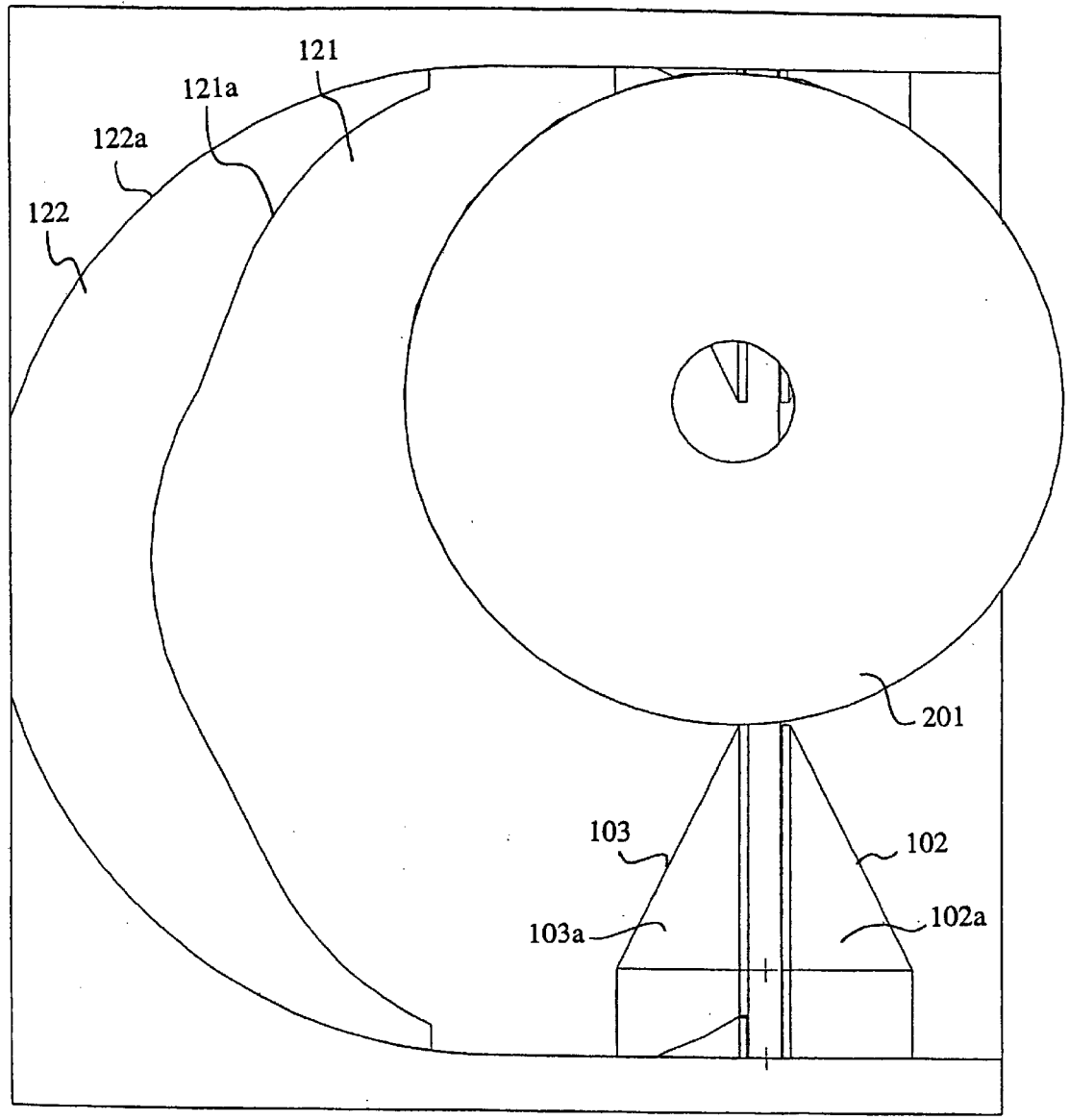
FIG. 23 shows the disk device shown in FIG. 21 as seen from below in a first embodiment of the present invention.
Figure 24:
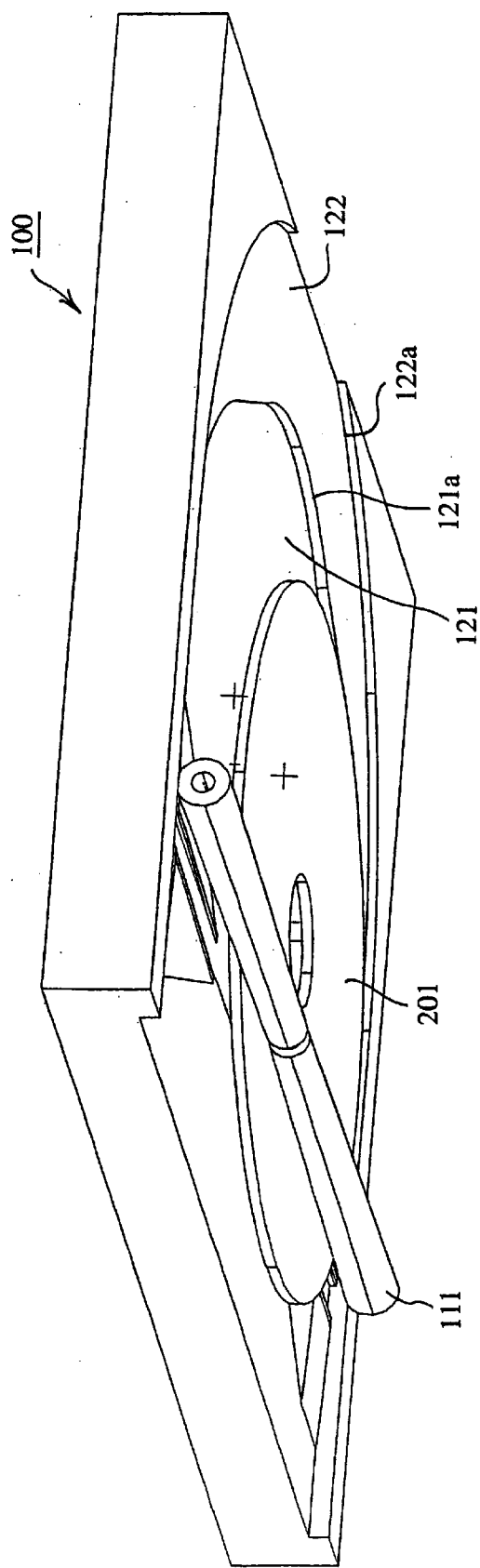
FIG. 24 is a three dimensional view showing the abutment of a the peripheral face of the small disk with the step of the small disk positioning recess when a small disk is conveyed into a disk device according to the first embodiment of the present invention.

FIG. 23 is a diagram of the disk selection mechanism of FIG. 22 seen from below. The disk is conveyed further into the inner housing as shown in FIG. 24 in this state by one pair of said tapered faces 102a, 103a and the conveying roller 111.

Figure 25:
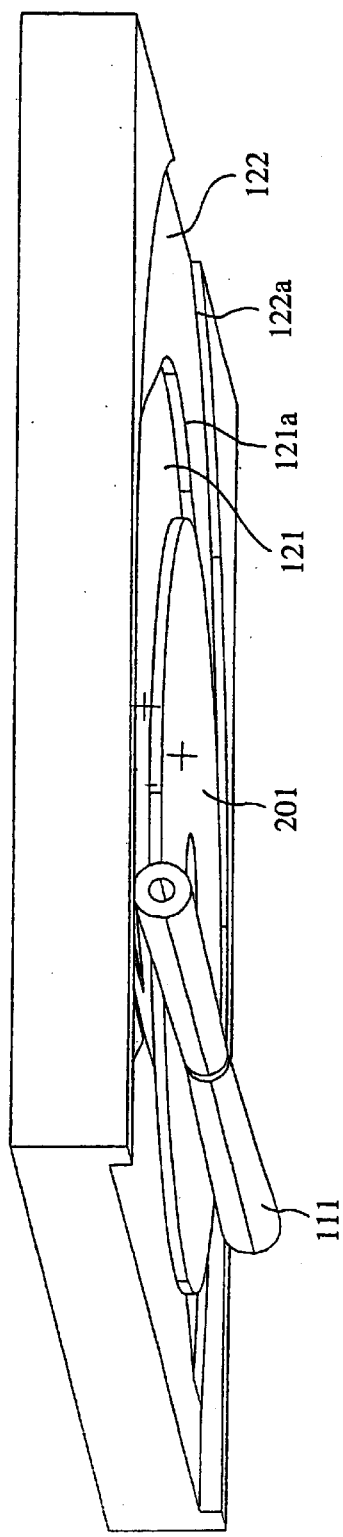
FIG. 25 is a three dimensional view showing the abutment of the peripheral face of the small disk with the step of the small disk positioning recess when a small disk is conveyed into a disk device according to the first embodiment of the present invention.
Figure 26:
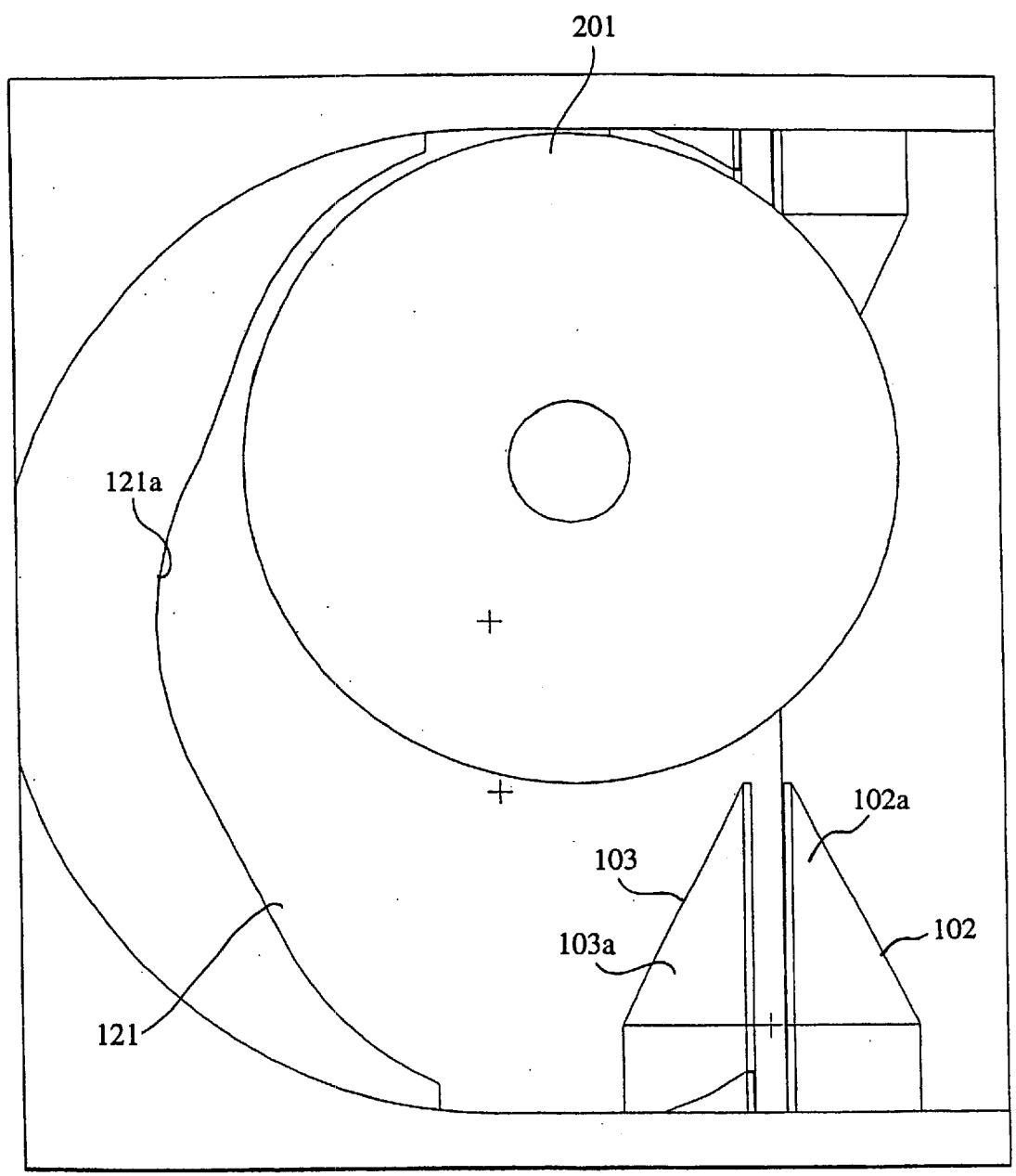
FIG. 26 shows the disk device of FIGS. 24 and 25 as seen from below in the first embodiment of the present invention.

Since the conveying roller 111 is formed in a trapezoid shape in which the outer periphery increases towards both ends from the center as shown in FIG. 23, the outer edge of the small disk 201 is conveyed being gripped between one pair of the tapered faces 102a, 103a and the conveying roller 111. Thus, a part of the peripheral edge of the small disk 201 is gripped between the outer face of the conveying roller 111 formed in a trapezoid shape and one pair of said tapered faces 102a, 103a. Furthermore the peripheral edge of the small disk 201 is conveyed into the inner housing along one of the tapered faces 102a, 103a and the outer face of the conveying roller 111. Thus, the disk comes into the state as shown in FIGS. 24, 25 and 26. As can be seen from the figures, the small disk 201 is in an approximately horizontal position from the position shown in FIG. 22. The peripheral face of the small disk 201 abuts with the step 121a of the recess 121 for positioning the small disk. Thereafter, since the small disk 201 is conveyed while being gripped by the conveying roller 111 formed in a trapezoid shape and one pair of the tapered faces 102a, 103a, a force acts on the small disk 201 towards the center of the conveying roller 111. The small disk 201 is conveyed to the inner housing along the step 121a of the small disk positioning recess 121 with the direction of displacement changed in the direction of the center (the direction Y shown in FIG. 25) of the conveying roller 111. As a result, the small disk 201, the peripheral face of which has abutted with the step 121a of the small disk positioning recess 121, is fixed in a position in the small disk positioning recess 121 along the step 121a.

When the small disk 201 is fixed in the above fixed position, the peripheral face of the small disk 201 does not abut with the tapered faces 102a, 103a of the first and second disk selection projections 102, 103.

As shown above, according to a first embodiment, a disk device is adapted so that a peripheral face of a large disk on insertion avoids a small disk abutment pin and abuts with a large disk abutment pin. A peripheral face of a small disk on insertion avoids a large disk abutment pin and abuts with a small disk abutment pin. The respective disks are placed on a turntable and clamped. These operations are performed reliably without increases in the complexity of the device.

Furthermore, when a small disk is inserted in an off-center position towards one end of a disk insertion mouth 101, the peripheral lateral face of the small disk abuts with the small disk abutting pin and is accurately placed in a fixed position. Thus, it is possible to clamp and hold a disk on a turntable.

As shown above, the disk device of the present invention is adapted for use as a disk device in an automobile since it allows for simple and highly reliable clamping of disks of differing sizes on a turntable.

What is claimed is:

1. A disk device comprising:
    a conveying roller for conveying circular disks of differing sizes;
    a disk guiding section facing said conveying roller and guiding said disk;
    a disk selection mechanism having projections which are provided in proximity with said conveying roller, said projections being disposed at predetermined positions of said disk guiding section for selectively abutting with a surface of the disk inserted between said conveying roller and said disk guiding section depending on an outer radius of the disk, thereby changing an angle of said disk in the conveying direction depending on the outer radius wherein a large radius disk is angled away from the disk selection mechanism and wherein the angle of a disk of a small radius is maintained or changed by the projections based on the position the small radius disk is inserted in the disk guiding section; and
    a positional determination mechanism for positioning the disk, an angle of which is regulated by said disk selection mechanism, at respective predetermined positions preset in accordance with the outer radius of said disk.

2. A disk device according to claim 1, wherein when a large disk is conveyed, said disk selection mechanism regulates an angle of said large disk in the conveying direction to an angle at which said large disk abuts only with a large disk position determination section in the positional determination mechanism, and wherein when a small disk is conveyed, said disk selection mechanism regulates an angle of said small disk in the conveying direction to an angle at which said small disk abuts only with a small disk position determination section.

3. A disk device according to claim 1, wherein said disk selection mechanism is adapted to place a small disk in a position in which said small disk does not abut with the projections when said small disk is positioned by said positional determination mechanism.

4. The device of claim 1, wherein when the small radius disk is inserted toward the center of the disk guiding section, the angle of the disk is maintained and the outer periphery edges of the small radius disk runs between the projections.

5. The device of claim 1, wherein when the small radius disk is inserted off-center of the disk guiding section, the angle of one outer edge of the small radius disk is changed by the projections so the outer edge of the small radius disk is angled away from the disk selection mechanism.

6. A method of sorting disks by size during loading into a disk selection mechanism, comprising the steps of:
    providing an opening for inserting the disks;
    providing adjacent to the opening disk selection projections, the disk selection projections having tapered edges for changing an angle of a disks;
    providing a conveying roller for guiding the disks to a disk positioning recess determined by the disk selection projections, wherein the angle of a disk of a large radius is changed by the disk selection projections so that the leading edge of the large radius disk is angled away from the disk selection mechanism and wherein the angle of a disk of a small radius is maintained or changed by the disk selection projections based on the position the small radius disk is inserted in the insertion opening; and
    positioning the disk in a large or small disk position recess based on the outer radius of the disk.

7. The method of claim 6, wherein when the small radius disk is inserted toward the center of the insertion opening, the angle of the disk is maintained and the outer periphery edges of the small radius disk runs between the disk selection projections.

8. The method of claim 7, wherein when the small radius disk is inserted off-center of the insertion opening, the angle of one outer edge of the small radius disk is changed by the disk selection projections so the outer edge of the small radius disk is angled away from the disk selection mechanism.

* * * * *

UNITED STATES PATENT AND TRADEMARK OFFICE
CERTIFICATE OF CORRECTION

PATENT NO. : 6,469,972 B1
DATED : October 22, 2002
INVENTOR(S) : Morimoto et al.

It is certified that error appears in the above-identified patent and that said Letters Patent is hereby corrected as shown below:

Title page,
Item [*] Notice, "Subject to any disclaimer, the term of this patent is extended or adjusted under 35 USC 154(b) by (38) days", delete the phrase "by 38 days" and insert -- by 13 days --

Signed and Sealed this

Fourteenth Day of October, 2003

JAMES E. ROGAN
*Director of the United States Patent and Trademark Office*